United States Patent
Ogino

(10) Patent No.: US 9,160,989 B2
(45) Date of Patent: Oct. 13, 2015

(54) IMAGE PROCESSING APPARATUS, IMAGE PROCESSING METHOD, AND STORAGE MEDIUM FOR INCREASING PIXELS

(71) Applicant: CANON KABUSHIKI KAISHA, Tokyo (JP)

(72) Inventor: Hiroshi Ogino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 14/088,869

(22) Filed: Nov. 25, 2013

(65) Prior Publication Data

US 2014/0152865 A1   Jun. 5, 2014

(30) Foreign Application Priority Data

Nov. 30, 2012  (JP) .................................. 2012-263516

(51) Int. Cl.
*H04N 9/04* (2006.01)
*H04N 9/67* (2006.01)

(52) U.S. Cl.
CPC ................. *H04N 9/045* (2013.01); *H04N 9/67* (2013.01); *H04N 2209/046* (2013.01)

(58) Field of Classification Search
CPC ......... H04N 9/735; H04N 9/045; H04N 9/67; H04N 9/7973; H04N 9/7976; H04N 9/825; H04N 9/832; H04N 9/73; H04N 9/3182; H04N 2209/046; H04N 1/60; H04N 1/6002; H04N 1/6005; H04N 1/6008; H04N 7/0135; H04N 7/0142; H04N 7/0145; H04N 7/0147; H04N 19/587; H04N 19/59; H04N 19/635; H04N 19/80; H04N 19/86; G06T 3/4007
See application file for complete search history.

(56) References Cited

U.S. PATENT DOCUMENTS

| | | | | |
|---|---|---|---|---|
| 7,929,759 B2* | 4/2011 | Peng et al. | ..................... | 382/167 |
| 8,335,372 B2* | 12/2012 | Hasegawa | ..................... | 382/160 |
| 8,587,712 B2* | 11/2013 | Terasawa | ..................... | 348/335 |
| 8,675,106 B2* | 3/2014 | Honda et al. | .................. | 348/273 |
| 8,798,398 B2* | 8/2014 | Hasegawa et al. | ............ | 382/300 |
| 2006/0198556 A1* | 9/2006 | Chen et al. | .................... | 382/162 |
| 2008/0284869 A1* | 11/2008 | Utsugi | ....................... | 348/222.1 |
| 2009/0295981 A1* | 12/2009 | Watanabe | ..................... | 348/345 |
| 2010/0091143 A1* | 4/2010 | Hara | .............................. | 348/241 |
| 2010/0104183 A1* | 4/2010 | Hasegawa | ..................... | 382/167 |
| 2013/0016251 A1* | 1/2013 | Ogasahara | .................... | 348/238 |

FOREIGN PATENT DOCUMENTS

JP        2008-015946 A        1/2008

* cited by examiner

*Primary Examiner* — Pritham Prabhakher
(74) *Attorney, Agent, or Firm* — Canon USA, Inc. IP Division

(57) ABSTRACT

An image processing apparatus enlarges the number of pixels of first image data made of a luminance signal and a color-difference signal in a vertical direction and in a horizontal direction, and causes each pixel to have a luminance signal and a color-difference signal to convert the image data made of the luminance signal and the color-difference signal into image data of a Bayer array made of R, G1, G2, and B signals. The image processing apparatus generates a luminance signal using one of the G1 signal and the G2 signal, the R signal, and the B signal in the image data of the Bayer array.

18 Claims, 12 Drawing Sheets

FIG. 3A

| Y(0,0) | Y(0,1) | Y(0,2) | Y(0,3) | ... | Y(0,N) |
|---|---|---|---|---|---|
| Y(1,0) | Y(1,1) | Y(1,2) | Y(1,3) | ... | Y(1,N) |
| Y(2,0) | Y(2,1) | Y(2,2) | Y(2,3) | ... | Y(2,N) |
| Y(3,0) | Y(3,1) | Y(3,2) | Y(3,3) | ... | Y(3,N) |
| ⋮ | ⋮ | ⋮ | ⋮ | ⋮ | ⋮ |
| Y(M,0) | Y(M,1) | Y(M,2) | Y(M,3) | ... | Y(M,N) |

FIG. 3B

| Y(0,0) | Y'(0,01) | Y(0,1) | Y'(0,12) | Y(0,2) | Y'(0,23) | Y(0,3) | ... | Y'(0,N) |
|---|---|---|---|---|---|---|---|---|
| Y(1,0) | Y'(1,01) | Y(1,1) | Y'(1,12) | Y(1,2) | Y'(1,23) | Y(1,3) | ... | Y'(1,N) |
| Y(2,0) | Y'(2,01) | Y(2,1) | Y'(2,12) | Y(2,2) | Y'(2,23) | Y(2,3) | ... | Y'(2,N) |
| Y(3,0) | Y'(3,01) | Y(3,1) | Y'(3,12) | Y(3,2) | Y'(3,23) | Y(3,3) | ... | Y'(3,N) |
| ⋮ | ⋮ | ⋮ | ⋮ | ⋮ | ⋮ | ⋮ | ⋮ | ⋮ |
| Y(M,0) | Y'(M,01) | Y(M,1) | Y'(M,12) | Y(M,2) | Y'(M,23) | Y(M,3) | ... | Y'(M,N) |

FIG. 3C

| Y (0, 0) | Y' (0, 01) | Y (0, 1) | Y' (0, 12) | Y (0, 2) | Y' (0, 23) | Y (0, 3) | ... | Y' (0, N) |
|---|---|---|---|---|---|---|---|---|
| Y'' (01, 0) | Y'' (01, 01) | Y'' (01, 1) | Y'' (01, 12) | Y'' (01, 2) | Y'' (01, 23) | Y'' (01, 3) | ... | Y'' (01, N) |
| Y (1, 0) | Y' (1, 01) | Y (1, 1) | Y' (1, 12) | Y (1, 2) | Y' (1, 23) | Y (1, 3) | ... | Y' (1, N) |
| Y'' (12, 0) | Y'' (12, 01) | Y'' (12, 1) | Y'' (12, 12) | Y'' (12, 2) | Y'' (12, 23) | Y'' (12, 3) | ... | Y'' (12, N) |
| Y (2, 0) | Y' (2, 01) | Y (2, 1) | Y' (2, 12) | Y (2, 2) | Y' (2, 23) | Y (2, 3) | ... | Y' (2, N) |
| Y'' (23, 0) | Y'' (23, 01) | Y'' (23, 1) | Y'' (23, 12) | Y'' (23, 2) | Y'' (23, 23) | Y'' (23, 3) | ... | Y'' (23, N) |
| Y (3, 0) | Y' (3, 01) | Y (3, 1) | Y' (3, 12) | Y (3, 2) | Y' (3, 23) | Y (3, 3) | ... | Y' (3, N) |
| ⋮ | ⋮ | ⋮ | ⋮ | ⋮ | ⋮ | ⋮ | | ⋮ |
| Y'' (M, 0) | Y'' (M, 01) | Y'' (M, 1) | Y'' (M, 12) | Y'' (M, 2) | Y'' (M, 23) | Y'' (M, 3) | ... | Y'' (M, N) |

FIG. 4A

| R (0,0) | R' (0,01) | R (0,1) | R' (0,12) |
|---|---|---|---|
| R" (01,0) | R"' (01,01) | R" (01,1) | R"' (01,12) |
| R (1,0) | R' (1,01) | R (1,1) | R' (1,12) |
| R" (12,0) | R"' (12,01) | R" (12,1) | R"' (12,12) |

FIG. 4B

| G (0,0) | R' (0,01) | G (0,1) | R' (0,12) |
|---|---|---|---|
| B" (01,0) | G"' (01,01) | B" (01,1) | G"' (01,12) |
| G (1,0) | R' (1,01) | G (1,1) | R' (1,12) |
| B" (12,0) | G"' (12,01) | B" (12,1) | G"' (12,12) |

| G (0,0) | G' (0,01) | G (0,1) | G' (0,12) |
|---|---|---|---|
| G" (01,0) | G"' (01,01) | G" (01,1) | G"' (01,12) |
| G (1,0) | G' (1,01) | G (1,1) | G' (1,12) |
| G" (12,0) | G"' (12,01) | G" (12,1) | G"' (12,12) |

| B (0,0) | B' (0,01) | B (0,1) | B' (0,12) |
|---|---|---|---|
| B" (01,0) | B"' (01,01) | B" (01,1) | B"' (01,12) |
| B (1,0) | B' (1,01) | B (1,1) | B' (1,12) |
| B" (12,0) | B"' (12,01) | B" (12,1) | B"' (12,12) |

FIG. 7A

| G1 (0,0) | R (0,1) | G1 (0,2) | R (0,3) | ... | G1 (0,N-1) | R (0,N) |
|---|---|---|---|---|---|---|
| B (1,0) | G2 (1,1) | B (1,2) | G2 (1,3) | ... | B (1,N-1) | G2 (1,N) |
| G1 (2,0) | R (2,1) | G1 (2,2) | R (2,3) | ... | G1 (2,N-1) | R (2,N) |
| B (3,0) | G2 (3,1) | B (3,2) | G2 (3,3) | ... | B (3,N-1) | G2 (3,N) |
| ⋮ | ⋮ | ⋮ | ⋮ | ⋮ | ⋮ | ⋮ |
| G1 (M-1,0) | R (M-1,1) | G1 (M-1,2) | R (M-1,1) | ... | G1 (M-1,N-1) | R (M-1,N) |
| B (M,0) | G2 (M,1) | B (M,2) | G2 (M,3) | ... | B (M,N-1) | G2 (M,N) |

FIG. 7B

| G1 (0,0) | G1 (0,2) | ... | G1 (0,N-1) |
|---|---|---|---|
| G1 (2,0) | G1 (2,2) | ... | G1 (2,N-1) |
| ⋮ | ⋮ | ⋮ | ⋮ |
| G1 (M-1,1) | G1 (M-1,2) | ... | G1 (M-1,N-1) |

| R' (0,0) | R' (0,2) | ... | R' (0,N-1) |
|---|---|---|---|
| R' (2,0) | R' (2,2) | ... | R' (2,N-1) |
| ⋮ | ⋮ | ⋮ | ⋮ |
| R' (M-1,1) | R' (M-1,2) | ... | R' (M-1,N-1) |

| B' (0,0) | B' (0,2) | ... | B' (0,N-1) |
|---|---|---|---|
| B' (2,0) | B' (2,2) | ... | B' (2,N-1) |
| ⋮ | ⋮ | ⋮ | ⋮ |
| B' (M-1,1) | B' (M-1,2) | ... | B' (M-1,N-1) |

| G2' (0,0) | G2' (0,2) | ... | G2' (0,N-1) |
|---|---|---|---|
| G2' (2,0) | G2' (2,2) | ... | G2' (2,N-1) |
| ⋮ | ⋮ | ⋮ | ⋮ |
| G2' (M-1,1) | G2' (M-1,2) | ... | G2' (M-1,N-1) |

FIG. 8A
(PRIOR ART)

| Y (0,0) | Y (0,1) | Y (0,2) | Y (0,3) | Y (0,4) |
|---|---|---|---|---|
| Y (1,0) | Y (1,1) | Y (1,2) | Y (1,3) | Y (1,4) |
| Y (2,0) | Y (2,1) | Y (2,2) | Y (2,3) | Y (2,4) |
| Y (3,0) | Y (3,1) | Y (3,2) | Y (3,3) | Y (3,4) |

| U (0,0) | | U (0,2) | | U (0,4) |
|---|---|---|---|---|
| U (1,0) | | U (1,2) | | U (1,4) |
| U (2,0) | | U (2,2) | | U (2,4) |
| U (3,0) | | U (3,2) | | U (3,4) |

| V (0,0) | | V (0,2) | | V (0,4) |
|---|---|---|---|---|
| V (1,0) | | V (1,2) | | V (1,4) |
| V (2,0) | | V (2,2) | | V (2,4) |
| V (3,0) | | V (3,2) | | V (3,4) |

FIG. 8B
(PRIOR ART)

| Y (0,0) | Y (0,1) | Y (0,2) | Y (0,3) | Y (0,4) |
|---|---|---|---|---|
| Y (1,0) | Y (1,1) | Y (1,2) | Y (1,3) | Y (1,4) |
| Y (2,0) | Y (2,1) | Y (2,2) | Y (2,3) | Y (2,4) |
| Y (3,0) | Y (3,1) | Y (3,2) | Y (3,3) | Y (3,4) |

| U (0,0) | U' (0,1) | U (0,2) | U' (0,3) | U (0,4) |
|---|---|---|---|---|
| U (1,0) | U' (1,1) | U (1,2) | U' (1,3) | U (1,4) |
| U (2,0) | U' (2,1) | U (2,2) | U' (2,3) | U (2,4) |
| U (3,0) | U' (3,1) | U (3,2) | U' (3,3) | U (3,4) |

| V (0,0) | V' (0,1) | V (0,2) | V' (0,3) | V (0,4) |
|---|---|---|---|---|
| V (1,0) | V' (1,1) | V (1,2) | V' (1,3) | V (1,4) |
| V (2,0) | V' (2,1) | V (2,2) | V' (2,3) | V (2,4) |
| V (3,0) | V' (3,1) | V (3,2) | V' (3,3) | V (3,4) |

FIG. 9A
(PRIOR ART)

| R(0,0) | R(0,1) | R(0,2) | R(0,3) | R(0,4) |
|---|---|---|---|---|
| R(1,0) | R(1,1) | R(1,2) | R(1,3) | R(1,4) |
| R(2,0) | R(2,1) | R(2,2) | R(2,3) | R(2,4) |
| R(3,0) | R(3,1) | R(3,2) | R(3,3) | R(3,4) |

| G(0,0) | G(0,1) | G(0,2) | G(0,3) | G(0,4) |
|---|---|---|---|---|
| G(1,0) | G(1,1) | G(1,2) | G(1,3) | G(1,4) |
| G(2,0) | G(2,1) | G(2,2) | G(2,3) | G(2,4) |
| G(3,0) | G(3,1) | G(3,2) | G(3,3) | G(3,4) |

| B(0,0) | B(0,1) | B(0,2) | B(0,3) | B(0,4) |
|---|---|---|---|---|
| B(1,0) | B(1,1) | B(1,2) | B(1,3) | B(1,4) |
| B(2,0) | B(2,1) | B(2,2) | B(2,3) | B(2,4) |
| B(3,0) | B(3,1) | B(3,2) | B(3,3) | B(3,4) |

FIG. 9B
(PRIOR ART)

| G(0,0) | R(0,1) | G(0,2) | R(0,3) | G(0,4) |
|---|---|---|---|---|
| B(1,0) | G(1,1) | B(1,2) | G(1,3) | B(1,4) |
| G(2,0) | R(2,1) | G(2,2) | R(2,3) | G(2,4) |
| B(3,0) | G(3,1) | B(3,2) | G(3,3) | B(3,4) |

FIG. 10
(PRIOR ART)

| R'(0,0) | R'(0,1) | R'(0,2) | R'(0,3) | R'(0,4) |
|---|---|---|---|---|
| R(1,0) | R'(1,1) | R(1,2) | R'(1,3) | R(1,4) |
| R'(2,0) | R'(2,1) | R'(2,2) | R'(2,3) | R'(2,4) |
| R(3,0) | R'(3,1) | R(3,2) | R'(3,3) | R(3,4) |

| G(0,0) | G'(0,1) | G(0,2) | G'(0,3) | G(0,4) |
|---|---|---|---|---|
| G'(1,0) | G(1,1) | G'(1,2) | G(1,3) | G'(1,4) |
| G(2,0) | G'(2,1) | G(2,2) | G'(2,3) | G(2,4) |
| G'(3,0) | G(3,1) | G'(3,2) | G(3,3) | G'(3,4) |

| B'(0,0) | B(0,1) | B'(0,2) | B(0,3) | B'(0,4) |
|---|---|---|---|---|
| B'(1,0) | B'(1,1) | B'(1,2) | B'(1,3) | B'(1,4) |
| B'(2,0) | B(2,1) | B'(2,2) | B(2,3) | B'(2,4) |
| B'(3,0) | B'(3,1) | B'(3,2) | B'(3,3) | B'(3,4) |

IMAGE PROCESSING APPARATUS, IMAGE PROCESSING METHOD, AND STORAGE MEDIUM FOR INCREASING PIXELS

BACKGROUND OF THE INVENTION

1. Field of the Invention

One disclosed aspect of the embodiments relates to an image processing apparatus, an image processing method, and a storage medium.

2. Description of the Related Art

RAW and Joint Photographic Experts Group (JPEG) are well-known file formats generated by a digital camera.

A sensor of the digital camera often employs a Bayer array including a two-dimensional array of R (red), G (green), and B (blue). In image data in a RAW format, each pixel includes a signal of a color corresponding to any of color filters according to the two-dimensional array of the color filters of an image sensor. A file in the RAW format is suitable for a case in which white balance processing for adjusting a balance of signal intensity among colors corresponding to the color filters or lateral chromatic aberration correction for adjusting an aberration due to a deviation of image forming positions among the colors are performed. For example, Japanese Patent Application Laid Open No. 2008-015946 discusses the lateral chromatic aberration correction is performed after image data in the RAW format is separated into image data made of signals of respective colors.

The image data in the RAW format has large data capacity and cannot be opened with a general-purpose image display viewer. Therefore, typically, interpolation processing for causing each pixel of the image data to have signals of all of the R, G, and B colors is performed, and a luminance signal (Y) and color-difference signals (U, V) are generated from the image data after the interpolation to generate a file in a JPEG format made of Y, U, and V image data.

Then, in the process for generating image data in the JPEG format from the image data in the RAW format, a high-frequency component is extracted from the luminance signal Y and edge enhancement processing is applied thereto, or an interpolation direction is determined when the color-difference signals U and V are generated so that false color suppression processing is applied.

In recent years, there is a demand for changing parameters of the white balance processing or the lateral chromatic aberration correction with respect to the Y, U, and V image data.

Therefore, in such a case, it can be considered to convert the Y, U, and V image data into R, G, and B image data, and to execute the white balance processing or the lateral chromatic aberration correction again with desired parameters.

However, a digital camera is often configured from the above-described image processing circuit using dedicated hardware for acceleration of the processing. That is, a camera including an image sensor of the Bayer array is provided with a module that expects an input of image data in the RAW format obtained by the image sensor of the Bayer array.

For example, when image data in the JPEG format is configured in a YUV422 that is a YUV format, one luminance signal Y is allocated to each pixel and one color-difference signal U and one color-difference signal V are allocated to each of two pixels adjacent to the each pixel, in the image data. Therefore, the configuration is different from that of the Bayer array in which one of R, G, and B signals is allocated to one pixel, and the module configured for the Bayer array cannot process the image data of the YUV422 in the JPEG format. A similar problem is caused not only in the digital camera, but also in a device provided with a module configured for the Bayer array. In addition, for a similar reason, a problem that the Y, U, and V image data in the JPEG format cannot be processed is caused not only in hardware, but also in an image processing apparatus that only includes software incorporated for the Bayer array.

Here, it can be considered to convert the image data of the YUV422 into image data in the RAW format of the Bayer array by generating the R, G, and B signals in each pixel from the image data of the YUV422, and thinning out the image data for each color. A method for generating the image data in the RAW format of the Bayer array from the image data of the YUV422 will be described with reference to FIGS. 8 and 9.

FIG. 8A illustrates an example of a configuration of the image data of the YUV422. One luminance signal Y is allocated to each pixel, but one color-difference signal U and one color-difference signal V are allocated only to each of the two pixels adjacent to the each pixel. Therefore, the color-difference signals U and V are interpolated in the horizontal direction with respect to the image data illustrated in FIG. 8A, so that image data in which the Y, U, and V signals are allocated to each of the pixels is generated as illustrated in FIG. 8B.

R, G, and B signals in each pixel are calculated from the Y, U, and V image data after the interpolation illustrated in FIG. 8B according to the following formula 1:

$$R = 1.000Y + 1.402V$$

$$G = 1.000Y - 0.344U - 0.714V$$

$$B = 1.000Y + 1.772U \quad \text{(formula 1)}$$

FIG. 9A illustrates image data where the R, G, and B signals in each pixel have been calculated. A signal of a color corresponding to a color filter at a position of each pixel is selected from the image data illustrated in FIG. 9A to accord with the Bayer array. In doing so, image data of the Bayer array illustrated in FIG. 9B can be generated. Then, the image data of the Bayer array illustrated in FIG. 9B is again input to the module configured for the Bayer array, so that the white balance processing or the lateral chromatic aberration correction can be executed with different parameters.

Image data to which the white balance processing or the edge enhancement processing have been applied with the new parameters is again converted into image data in the JPEG format made of Y, U, and V. In generating the Y, U, and V image data from the R, G, and B image data of the Bayer array, it is necessary to perform calculation using the R, G, and B signals for the same pixel. Therefore, to generate the Y, U and V image data from the image data of the Bayer array illustrated in FIG. 9B, the interpolation processing for causing each pixel to have signals of all of the R, G, and B colors is performed as illustrated in FIG. 10.

The signals indicated by R', G', and B' in the image data illustrated in FIG. 10 are signals obtained by the interpolation processing. The signals obtained by the interpolation processing are values obtained by weighted addition of neighbor signals of the same color and are values presumed from the neighbor signals. Accordingly, the signals have poor reproducibility in minute signal level change. Therefore, a band of the image data illustrated in FIG. 10 after the interpolation processing for R, G, and B is lower than that of the image data illustrated in FIG. 9A before the interpolation processing for R, G, and B, although both of the image data include all of the R, G, and B color signals in each pixel in a similar manner. That is, if the Y, U, and V image data is simply converted into the R, G, and B image data of the Bayer array and the R, G, and B image data is returned to the Y, U, and V image data again, the band of the image data is decreased.

SUMMARY OF THE INVENTION

According to an aspect of the embodiments, an image processing apparatus includes an enlargement circuit configured to increase the number of pixels in a vertical direction and in a horizontal direction, and to cause each pixel to have a luminance signal and a color-difference signal with respect to first image data made of a luminance signal and a color-difference signal, a conversion circuit connected to the enlargement circuit, and configured to convert the luminance signal and the color-difference signal obtained in the enlargement circuit into image data of a Bayer array made of R, G1, G2, and B signals, and a development circuit configured to generate second image data made of a luminance signal and a color-difference signal from the image data of the Bayer array converted in the conversion circuit, wherein the development circuit generates the luminance signal using one of the G1 signal and the G2 signal, the R signal, and the B signal in the image data of the Bayer array.

Further features of the disclosure will become apparent from the following description of exemplary embodiments with reference to the attached drawings.

BRIEF DESCRIPTION OF THE DRAWINGS

FIG. 3A is a diagram for describing a luminance signal to be input to an enlargement processing unit, FIG. 3B is a diagram for describing the luminance signal to which enlargement processing in a horizontal direction is applied, and FIG. 3C is a diagram for describing the luminance signal to which the enlargement processing in the horizontal direction and in a vertical direction is applied.

FIG. 4A is a diagram for describing image data generated in an RGB conversion unit, and FIG. 4B is a diagram for describing image data generated in a Bayer array conversion unit.

FIG. 7A is a diagram for describing image data of the Bayer array to be input in the development processing unit, and FIG. 7B is a diagram for describing R, G1, G2, and B image data generated from the image data of the Bayer array to be input to the development processing unit.

FIG. 8A is a diagram for describing a configuration of image data of a YUV422 in the prior art, and FIG. 8B is a diagram for describing interpolation processing for a UV signal of the image data of the YUV422 in the prior art.

FIG. 9A is a diagram for describing image data of R, G, and B signals generated from Y, U, and V signals in the prior art, and FIG. 9B is a diagram for describing processing for generating image data of the Bayer array from the image data illustrated in FIG. 9A in the prior art.

FIG. 10 is a diagram for describing interpolation processing with respect to image data of the Bayer array in the prior art.

DESCRIPTION OF THE EMBODIMENTS

Various exemplary embodiments, features, and aspects of the disclosure will be described in detail below with reference to the drawings.

An exemplary embodiment will be described.

Figure 1:
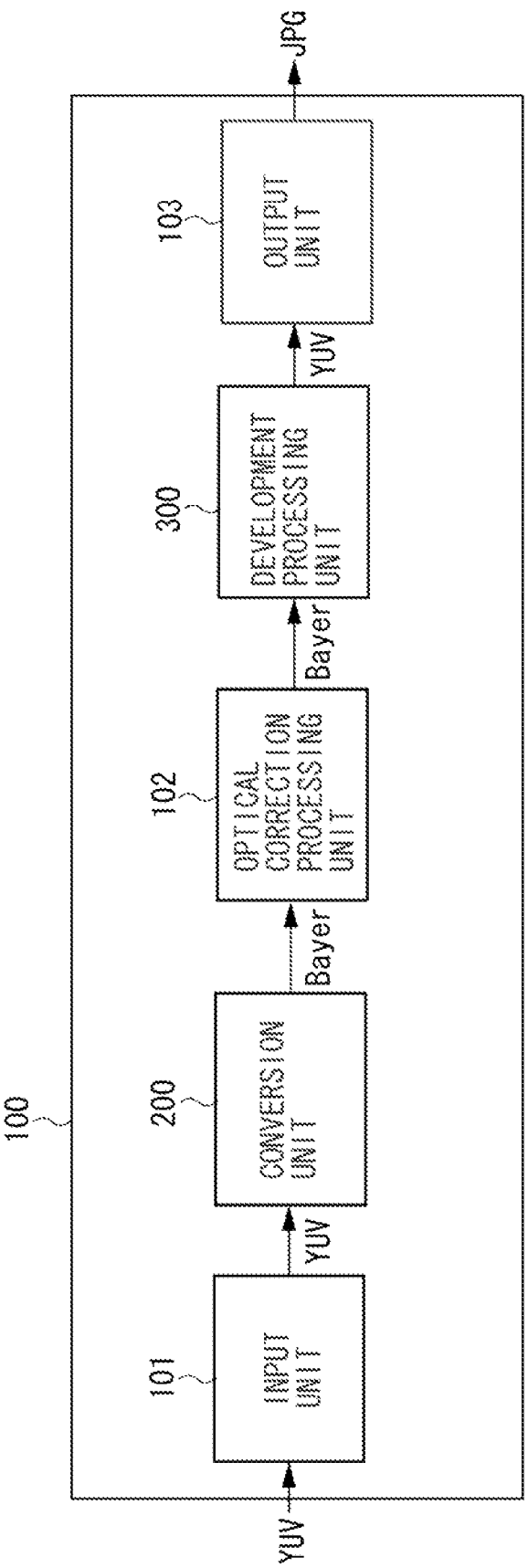
FIG. 1 is a block diagram illustrating a schematic configuration of an image processing apparatus according to an exemplary embodiment.

FIG. 1 is a block diagram illustrating a schematic configuration of an image processing apparatus according to an exemplary embodiment. An image processing apparatus 100 illustrated in FIG. 1 includes an input unit 101, a conversion unit 200, an optical correction processing unit 102, a development processing unit 300, and an output unit 103.

Details of image processing by the image processing apparatus having the above-described configuration will be described.

First, Y, U, and V image data made of a luminance signal Y, a color-difference signal U, and a color-difference signal V is input to the input unit 101. The image data includes a YUV422, and each of the color-difference signals U and V has half the number of pixels and resolution of the luminance signal Y either in a horizontal direction or in a vertical direction. The Y, U, and V image data input to the input unit 101 to output to the conversion unit 200.

The conversion unit 200 converts the Y, U, and V image data input from the input unit 101 into image data of a Bayer array made of R (red), G (green), and B (blue) signals. Note that, among the G signals, a signal of a pixel positioned in the horizontal direction of a pixel corresponding to the R signal is G1, and a signal of a pixel positioned in the horizontal direction of a pixel corresponding to the signal B is G2. Note that, although details will be described below, the numbers of pixels of the image data of the Bayer array in both of the vertical direction and the horizontal direction are twice as many as the luminance signal Y of the input Y, U, and V image data.

Next, the optical correction processing unit 102 applies optical correction processing for correcting a lateral chromatic aberration or a distortion due to an image forming optical system of an imaging apparatus, or white balance processing to the image data of the Bayer array made of the R, G, and B signals converted in the conversion unit 200. The correction of a lateral chromatic aberration is, for example, as discussed in Japanese Patent Application Laid-Open No. 2008-015946, processing for respectively replacing the signals of the R and B pixels with signals of pixels that should exist where the G (G1 and G2) signals are reference signals.

The image data of the Bayer array that has been subjected to the optical correction processing for correcting the lateral chromatic aberration or the distortion in the optical correction processing unit 102 is input to the development processing unit 300.

The development processing unit 300 applies processing such as edge enhancement processing and gamma correction processing to the image data of the Bayer array input from the optical correction processing unit 102, and converts the image data of the Bayer array into Y, U, and V image data. Details will be described below, but the luminance signal Y of the Y, U, and V image data output from the development processing unit 300 has half the numbers of pixels in the horizontal direction and in the vertical direction of the image data of the Bayer array to be input to the development processing unit 300. The Y, U, and V image data processed in the development processing unit 300 is output to the output unit 103.

The output unit 103 applies compression processing to the Y, U, and V image data input from the development processing unit 300 to generate image data in a JPEG format.

Figure 2:
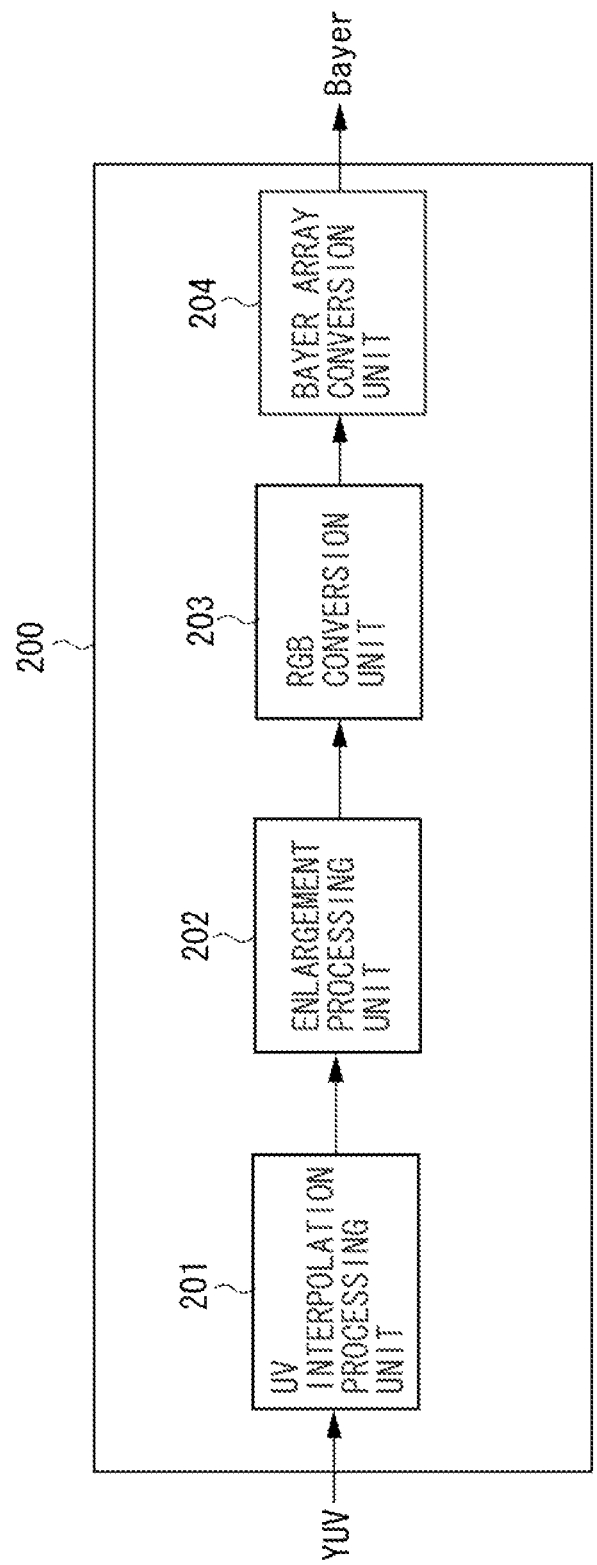
FIG. 2 is a block diagram illustrating a schematic configuration of a conversion unit.

The conversion unit 200, which is one of the characteristic features of the present exemplary embodiment, will be described in detail. FIG. 2 is a block diagram illustrating a schematic configuration of the conversion unit 200.

The Y, U, and V image data input from the input unit 101 to the conversion unit 200 is first input to a UV interpolation processing unit 201. Then, in the conversion unit 200, pixel interpolation processing is applied to the color-difference signals U and V so that both of the numbers of pixels of the color-difference signals U and V in the horizontal direction and in the vertical direction become equal to the numbers of pixels of the Y signal in the horizontal direction and in the vertical direction. That is, the Y, U, and V image data illustrated in FIG. 8A is converted into the Y, U, and V image data illustrated in FIG. 8B.

For example, like a color-difference signal U'(0, 1) illustrated in FIG. 8B, when there is no corresponding signal in the image data illustrated in FIG. 8A, such signal is calculated from the color-difference signals U of pixels positioned adjacent to the pixel of the signal in the horizontal direction by the interpolation processing. To be specific, the color-difference signal U'(0, 1) is calculated from color-difference signals U(0, 0) and U(0, 2) of horizontally adjacent pixels illustrated in FIG. 8A with a formula 2:

$$U'(0, 1)=(U(0, 0)+U(0, 2))/2 \quad \text{(formula 2)}$$

The interpolation processing is also applied to the color-difference signal V in the horizontal direction in a similar manner, and image data in which all pixels have Y, U, and V signals is generated and is input to the enlargement processing unit 202.

Note that, like Y, U, V 420, when the number of pixels of the color-difference signals U and V in both of the horizontal direction and the vertical direction are half of the luminance signal Y, the interpolation processing is applied to the respective color-difference signals U and V in both of the horizontal direction and the vertical direction. The formula 2 is an example of the interpolation processing performed in the UV interpolation processing unit 201, and it is desirable to perform the processing in view of a centroid position (weighted center position) of the color-difference signals U and V with respect to the luminance signal Y.

In the enlargement processing unit 202, the enlargement processing is applied to the Y, U, and V image data output from the UV interpolation processing unit 201 so that the numbers of pixels in the horizontal direction and in the vertical direction are doubled. For example, when the luminance signal Y illustrated in FIG. 3A is input to the enlargement processing unit 202, first, the enlargement processing is applied in the horizontal direction, and the luminance signal Y illustrated in FIG. 3B is generated.

At this time, a luminance signal of a pixel that does not exist in FIG. 3A, such as Y'(0, 01) illustrated in FIG. 3B is calculated from horizontally adjacent pixel signals by the interpolation processing. To be specific, Y'(0, 01) is calculated from Y(0, 0) and Y(0, 1) illustrated in FIG. 3A with the following formula 3:

$$Y'(0, 01)=(Y(0, 0)+Y(0, 1))/2 \quad \text{(formula 3)}$$

Next, the luminance signal Y illustrated in FIG. 3B, to which the enlargement processing has been applied in the horizontal direction, is subjected to the enlargement processing in the vertical direction, and the luminance signal Y illustrated in FIG. 3C is generated.

At this time, a luminance signal of a pixel that does not exist in FIG. 3B, such as Y"(01, 1) illustrated in FIG. 3C, is calculated from vertically adjacent pixel signals by the interpolation processing. To be specific, Y"(01, 1) is calculated from Y(0, 1) and Y(1, 1) with the following formula 4:

$$Y''(01, 1)=(Y(0, 1)+Y(1, 1))/2 \quad \text{(formula 4)}$$

Then, the enlargement processing unit 202 applies the enlargement processing to the color-difference signals U and V in the horizontal direction and in the vertical direction similarly to the luminance signal Y, and outputs enlarged Y, U, and V image data to an RGB conversion unit 203.

The RGB conversion unit 203 calculates R, G, and B signals for each pixel using the above-described conversion formula 1, for example, with respect to the Y, U, and V image data input from the enlargement processing unit 202.

FIG. 4A illustrates the R, G, and B signals calculated in the RGB conversion unit 203. In FIG. 4A, signals indicated by R', G', and B' are signals calculated from a luminance signal Y' and color-difference signals U' and V' calculated by the interpolation processing when the enlargement processing unit 202 applies the enlargement processing in the horizontal direction. Also, in FIG. 4A, signals indicated by R", G", and B" are signals calculated from luminance signal Y", color-difference signals U" and V" by the interpolation processing when the enlargement processing unit 202 applies the enlargement processing in the vertical direction.

Then, the R, G, and B image data converted in the RGB conversion unit 203 is input to a Bayer array conversion unit 204.

The Bayer array conversion unit 204 selects, for each pixel, any of the R, G, and B signals from the R, G, and B signals illustrated in FIG. 4A input from the RGB conversion unit 203 to accord with the Bayer array. In doing so, the image data of the Bayer array is generated, as illustrated in FIG. 4B. Such image data of the Bayer array is image data of the Bayer array generated from the Y, U, and V image data enlarged twice in the horizontal direction and in the vertical direction in the enlargement processing unit 202. Therefore, it can be understood that the numbers of pixels of the image data of the Bayer array in both of the vertical direction and the horizontal direction are twice as many as the luminance signal Y of the Y, U, and V image data input to the input unit 101. Note that the R and B signals corresponding to the pixel, the G signal of which has been selected, are not used afterward. Similarly, the R and B signals corresponding to the pixel, the R signal of which has been selected, are not used afterward, and the R and G signals corresponding to the pixel, the B signal of which has been selected, are not used afterward.

Here, one of the pixel corresponding to the G1 signal and the pixel corresponding to the G2 signal among the R, G, and B image data output from the Bayer array conversion unit 204 is caused to accord with a pixel, a signal of which has been calculated by the interpolation processing in the enlargement processing unit 202, and the other is caused not to accord with the pixel. That is, it is configured such that one of the pixel corresponding to the G1 signal and the pixel corresponding to the G2 signal accords with the pixel of the image data illustrated in FIG. 3A before being subjected to the enlargement processing, and the other does not accord with the pixel.

A band of the luminance signal calculated by the interpolation processing in the enlargement processing unit 202 is deteriorated. Accordingly, bands of the R, G, and B signals generated using the luminance signal with the deteriorated band are also deteriorated. Therefore, in the present exemplary embodiment, one of the G1 and G2 signals is generated from a luminance signal, the band of which is not deteriorated, so that the luminance signal Y can be generated using a G signal, the band of which is not deteriorated when the Y, U, and V signals are generated from the R, G, and B signals again. In the present exemplary embodiment, the G1 signal is a signal generated using the luminance signal that has not been subjected to the interpolation processing in the enlargement processing unit 202.

Then, the optical correction processing unit 102 applies the optical correction processing for correcting a lateral chromatic aberration or a distortion due to the image forming optical system of the imaging apparatus to the image data of the Bayer array made of the R, G, and B signals converted in the conversion unit 200.

Here, the lateral chromatic aberration will be described as an example of the optical correction processing. The lateral chromatic aberration refers to a phenomenon in which magnifications of an object image formed with the B signal and of an object image formed with the R signal are different with respect to an object image formed with the G signal, because there is a difference in refractive index depending on a wavelength of light. That is, the correction of the lateral chromatic aberration is to cause the magnifications of the object images formed with each of the R, G, and B signals to accord with one another, and in the present exemplary embodiment, the magnifications of the object images of the R and B signals are caused to accord with the magnification of the object image of the G signal.

The difference in magnification of the object images among the colors corresponds to an image height of a pixel. Therefore, the optical correction processing unit 102 acquires a correction amount corresponding to the image height of a focused pixel from a table of lateral chromatic aberration correction amount (not illustrated). The correction amounts of the R signal and of the B signal are separately prepared, and the correction is performed with respect to each of the R signal and the B signal. Here, description will be given taking the correction of the R signal as an example.

The correction amount indicates the number of pixels shifted from a correct pixel position in decimals. If the correction amount is a positive value, the value indicates that the R signal is shifted more outward than the G signal with respect to an optical center, and if the correction amount is a negative value, the vale indicates that the R signal is shifted more inward than the G signal with respect to the optical center. In the table of lateral chromatic aberration correction amounts, the correction amount with respect to the image height in each predetermined section is stored. Data between the stored image height and an image height is obtained by linear approximation or approximation of a quadratic curve.

The optical correction processing unit 102 applies the correction processing for correcting a lateral chromatic aberration to the input image data of the Bayer array based on the obtained correction amount. The correction amount is a phase difference amount obtained by a distortion amount at a position of the focused pixel being separated into phase difference components in the horizontal direction and in the vertical direction. Conceptual diagrams illustrating correction of the phase difference are FIGS. 5A to 5C.

Figure 5A:
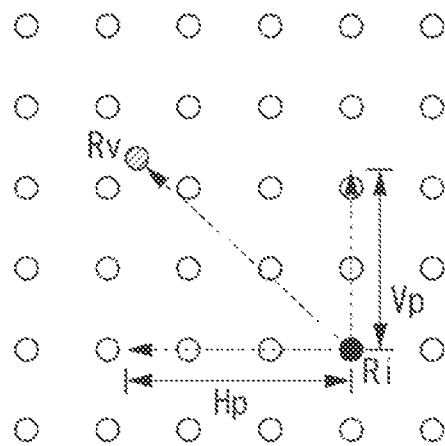
FIG. 5A is a diagram for describing a phase where a focused pixel Ri should exist.

A black pixel of FIG. 5A indicates a phase where a focused pixel Ri should exist, while a gray pixel is a virtual pixel Rv indicating a position where the focused pixel Ri is shifted from an original position by being subjected to the lateral chromatic aberration.

To correct the lateral chromatic aberration, a signal of the virtual pixel Rv shifted by Hp in the horizontal direction and by Vp in the vertical direction is obtained, and the signal may just be used as a signal of the focused pixel Ri.

Figure 5B:
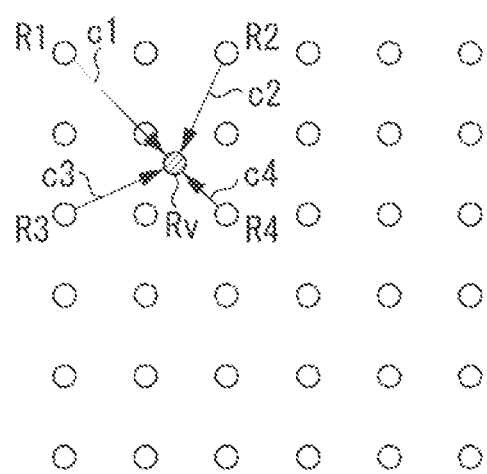
FIG. 5B is a diagram for describing how to obtain a value of a virtual pixel Rv.
Figure 5C:
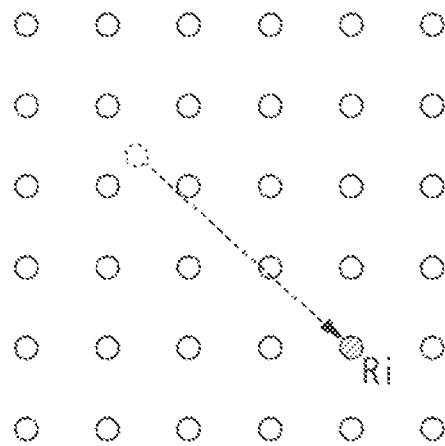
FIG. 5C is a diagram for describing replacement of a value of the focused pixel Ri with the value of the virtual pixel Rv.

The virtual pixel Rv can be, as illustrated in FIG. 5B, generated by being subjected to weighted interpolation calculation with distances between pixels c1, c2, c3, c4 between pixels R1, R2, R3, and R4 and the virtual pixel Rv using the actually captured pixels R1, R2, R3, and R4 existing in the neighbor. Then, as illustrated in FIG. 5C, the signal of the focused pixel Ri is replaced with a signal of the generated virtual pixel Rv, and the lateral chromatic aberration is corrected.

Figure 6:
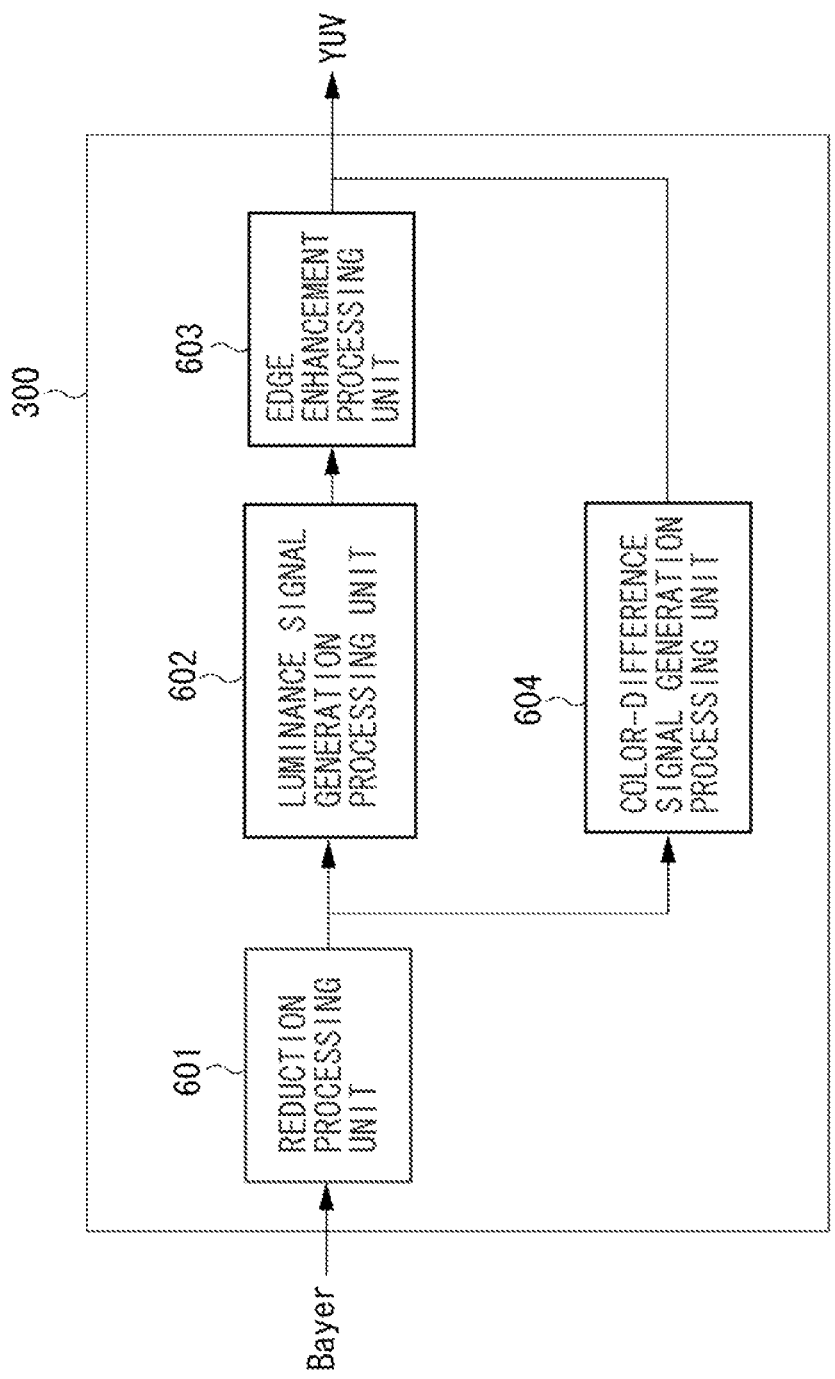
FIG. 6 is a block diagram illustrating a schematic configuration of a development processing unit.

The development processing unit 300 will be described in detail. FIG. 6 is a block diagram illustrating a schematic configuration of the development processing unit 300.

The image data of the Bayer array is input from the optical correction processing unit 102. A reduction processing unit 601 generates, from the image data of the Bayer array illustrated in FIG. 7A, image data made of respective R, G1, G2, and B signals illustrated in FIG. 7B, which have half the numbers of pixels of the image data of the Bayer array in the horizontal direction and in the vertical direction.

The G1 signals illustrated in FIG. 7B are generated such that all signals except the G1 signals illustrated in FIG. 7A are omitted. The G1 signals are arranged in every other pixel in the vertical direction and in the horizontal directions in the image data of the Bayer array. Therefore, the numbers of pixels of the image data in the horizontal direction and in the vertical directions after rearrangement becomes half the numbers of pixels of the original image data of the Bayer array.

Further, to adjust centroids of the R signal illustrated in FIG. 7B and of the G1 signal illustrated in FIG. 7B, the R signal illustrated in FIG. 7B is calculated from the R signals horizontally adjacent to the G1 signal in FIG. 7A by the interpolation processing. For example, a signal of R'(2, 2) illustrated in FIG. 7B is calculated from signals of R(2, 1) and R(2, 3) illustrated in FIG. 7A with the following formula 5:

$$R'(2, 2)=(R(2, 1)+R(2, 3))/2 \quad \text{(formula 5)}$$

Note that, to adjust centroids of the R signal and of the G1 signal positioned at an end portion and not sandwiched by the R signals, like G1(0, 0), a signal of R (0, 1) adjacent to G1(0, 0) is copied and the following formula 6 may just be used:

$$R'(0, 0)=(R(0, 1)+R(0, 1))/2=R(0, 1) \quad \text{(formula 6)}$$

Similarly, to adjust centroids of the B signal and of the G1 signal illustrated in FIG. 7B, the B signal illustrated in FIG. 7B is calculated from the B signals vertically adjacent to the G1 signal illustrated in FIG. 7A by the interpolation processing. For example, a signal of B'(2, 2) illustrated in FIG. 7B is calculated from signals of B(1, 2) and B(3, 2) illustrated in FIG. 7A with the following formula 7:

$$B'(2, 2)=(B(1, 2)+B(3, 2))/2 \quad \text{(formula 7)}$$

Note that, to adjust centroids of the B signal and of the G1 signal positioned at an end portion and not sandwiched by the B signals, like G1(0, 0), a signal of B (1, 0) adjacent to G1(0, 0) is copied and the following formula 8 may just be used:

$$B'(0, 0)=(B(1, 0)+B(1, 0))/2=B(1, 0) \quad \text{(formula 8)}$$

Further, to adjust centroids of the G2 signal and of the G1 signal illustrated in FIG. 7B, the G2 signal of FIG. 7B is calculated from the G2 signals obliquely adjacent to the G1 signal in FIG. 7A by the interpolation processing. For example, a signal of G2'(2, 2) illustrated in FIG. 7B is calculated from signals of G2(1, 1), G2(1, 3), G2(3, 1), and G2(3, 3) illustrated in FIG. 7A with the following formula 9:

$$G2'(2, 2)=(G2(1, 1)+G2(1, 3)+G2(3, 1)+G2(3, 3))/4 \quad \text{(formula 9)}$$

Note that, to adjust centroids of the G2 signal and of the G1 signal positioned at an end portion and not sandwiched by the G2 signals, like G1(0, 0), a signal of G2(1, 1) adjacent to G1(0, 0) is copied and the following formula 10 may just be used:

$$G2'(0, 0) = (G2(1, 1) + G2(1, 1) + G2(1, 1) + G2(1, 1))/4 = G2(1, 1) \quad \text{(formula 10)}$$

Then, the R, G1, G2, and B signals generated in the reduction processing unit 601 are input to a luminance signal generation processing unit 602 and a color-difference signal generation processing unit 604.

The luminance signal generation processing unit 602 generates the luminance signal Y for each pixel from the R, G1, and B signals input from the reduction processing unit 601 using the following formula 11:

$$Y = 0.299R + 0.587G1 + 0.114B \quad \text{(formula 11)}$$

When the luminance signal Y is calculated, the G1 signal is used rather than using the G2 signal, the band of which has been deteriorated due to the interpolation processing. Since the R and B signals have been subjected to the interpolation processing, the bands of the R and B signals are low, but the decrease of the band of the G1 signal to which the maximum weighting is applied when the luminance signal is generated is suppressed. Therefore, the deterioration of the image quality of the luminance signal Y can be reduced. The luminance signal Y generated in the luminance signal generation processing unit 602 is input to an edge enhancement processing unit 603, and the luminance signal Y to which the edge enhancement processing is applied is generated.

The color-difference signal generation processing unit 604 generates a color signal R-G and a color signal B-G from the R, G1, G2, and B signals input from the reduction processing unit 601. At this time, the interpolation processing applied in the conversion unit 200, in the reduction processing unit 601, and the like is different in each of the R, G1, G2, and B signals. Therefore, correction processing for correcting a false color signal generated due to a band gap among the signals and a false color signal due to saturation of any signal, and the like is performed.

To be specific, the color-difference signal generation processing unit 604 obtains a first difference that is a difference between a sum of signals of two pixels adjacent to the focused pixel at an upper side and a sum of signals of two pixels adjacent to the focused pixel at a lower side. Further, the color-difference signal generation processing unit 604 obtains a second difference that is a difference between a sum of signals of two pixels adjacent to the focused pixel at a left side, and a sum of signals of two pixels adjacent to the focused pixel at a right side. The color-difference signal generation processing unit 604 then determines the correlation in the vertical direction is higher than that in the horizontal direction if the first difference is smaller than the second difference, and obtains the color signal R-G using the G2 signal as G and obtains the color signal B-G using the G1 signal as G. If the first difference is larger than the second difference, the color-difference signal generation processing unit 604 determines that the correlation in the horizontal direction is higher than that in the vertical direction, and obtains the color signal R-G using the G1 signal as G and obtains the color signal B-G using the G2 signal as G. Note that if the first difference and the second difference are equal, the color signal R-G and the color signal B-G are obtained using a mean value of the G1 and G2 signals as G.

Further, after the false color correction processing and the like are performed, the color-difference signal generation processing unit 604 applies color gain processing to the color signal R-G and the color signal B-G by color matrix processing so that the image data can be reproduced in an optimal color, and generates the color-difference signal U and the color-difference signal V.

Then, the development processing unit 300 integrates the luminance signal Y generated in the edge enhancement processing unit 603 and the color-difference signals U and V generated in the color-difference signal generation processing unit 604, and outputs the integrated data as the Y, U, and V image data.

As described above, according to the present exemplary embodiment, the Y, U, and V image data is converted into the image data of the Bayer array once, so that the deterioration of the image quality is decreased, and a conventional Bayer-based module can be used. Accordingly, the increase in cost can be suppressed.

At that time, the Y, U, and V image data is enlarged twice in the horizontal direction and in the vertical direction, and then converted into the R, G, and B image data to generate the image data of the Bayer array. In doing so, either one of the G1 and the G2 signals included in the Bayer array becomes a signal generated using the luminance signal not subjected to the interpolation processing in the enlargement processing unit 202. Therefore, if the Y, U, and V image data is generated using the G signal generated using the luminance signal not subjected to the interpolation processing, the deterioration of the band of the luminance signal can be suppressed.

Note that the disclosure is not limited to the above-described exemplary embodiment and may have various improvements and change of design without departing from the gist of the disclosure.

Embodiments can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-263516 filed Nov. 30, 2012, which is hereby incorporated by reference herein in its entirety.

What is claimed is:
1. An image processing apparatus comprising:
an enlargement circuit configured to increase number of pixels in a vertical direction and in a horizontal direction, and to cause each pixel in the pixels to have a luminance signal and a color-difference signal with respect to first image data made of a luminance signal and a color-difference signal;

a conversion circuit connected to the enlargement circuit, and configured to convert the luminance signal and the color-difference signal obtained in the enlargement circuit into image data of a Bayer array made of R, G1, G2, and B signals; and a development circuit configured to generate second image data made of a luminance signal and a color-difference signal from the image data of the Bayer array converted in the conversion circuit, wherein the development circuit generates the luminance signal using one of the G1 signal and the G2 signal, the R signal, and the B signal in the image data of the Bayer array, wherein the enlargement circuit enlarges the first image data by interpolation processing, the conversion circuit converts the G1 signal from the luminance signal included in the first image data, and converts the G2 signal from the luminance signal generated by the interpolation processing by the enlargement circuit, and the development circuit generates the luminance signal using the G1 signal, the R signal, and the B signal.

2. The image processing apparatus according to claim 1, wherein the development circuit applies interpolation processing to the R signal to cause centroids of the R signal and of the G1 signal to accord with each other, applies interpolation processing to the B signal to cause centroids of the B signal and of the G1 signal to accord with each other, and generates the luminance signal using the G1 signal, the R signal obtained by the interpolation processing, and the B signal obtained by the interpolation processing.

3. The image processing apparatus according to claim 1, wherein the enlargement circuit causes number of pixels of the first image data in the horizontal direction and in the vertical direction to be twice number of pixels of the luminance signal included in the first image data in the horizontal direction and in the vertical direction by interpolation processing.

4. The image processing apparatus according to claim 1, wherein the development circuit generates the color-difference signal using the G1 signal, the G2 signal, the R signal, and the B signal.

5. The image processing apparatus according to claim 4, wherein the development circuit selects either obtaining a difference between the R signal and the G1 signal and a difference between the B signal and the G2 signal, or obtaining a difference between the R signal and the G2 signal and a difference between the B signal and the G1 signal.

6. The image processing apparatus according to claim 5, wherein the development circuit performs the selection for each pixel.

7. The image processing apparatus according to claim 1, further comprising:

a correction circuit configured to apply at least one of white balance processing, correction of a lateral chromatic aberration, and correction of a distortion, to the image data of the Bayer array generated in the conversion circuit, wherein the development circuit generates the luminance signal using the image data of the Bayer array output from the correction circuit.

8. An image processing apparatus comprising:

a processor; and a memory connected to the processor, the memory having instructions that, when executed by the processor, perform operations comprising:

increasing number of pixels of first image data made of a luminance signal and a color-difference signal in a vertical direction and in a horizontal direction, and causing each pixel in the pixels to have a luminance signal and a color-difference signal;

converting the luminance signal and the color-difference signal into image data of a Bayer array made of R, Gl, G2, and B signals; and generating second image data made of a luminance signal and a color-difference signal from the image data of the Bayer array, wherein the luminance signal of the second image data is generated from one of the G1 signal and the G2 signal, the R signal, and the B signal in the image data of the Bayer array, wherein increasing number of pixels of first image data comprises enlarging the first image data by interpolation processing, wherein converting the luminance signal and the color-difference signal comprises converting the G1 signal from the luminance signal included in the first image data, and converting the G2 signal from the luminance signal generated by the interpolation processing, and wherein generating second image data comprises generating the luminance signal using the G1 signal, the R signal, and the B signal.

9. An image processing method comprising:

increasing number of pixels of first image data made of a luminance signal and a color-difference signal in a vertical direction and in a horizontal direction, and causing each pixel in the pixels to have a luminance signal and a color-difference signal;

converting the luminance signal and the color-difference signal into image data of a Bayer array made of R, G1, G2, and B signals; and generating second image data made of a luminance signal and a color-difference signal from the image data of the Bayer array;

wherein the luminance signal of the second image data is generated from one of the G1 signal and the G2 signal, the R signal, and the B signal in the image data of the Bayer array, wherein increasing number of pixels of first image data comprises enlarging the first image data by interpolation processing, wherein converting the luminance signal and the color-difference signal comprises converting the G1 signal from the luminance signal included in the first image data, and converting the G2 signal from the luminance signal generated by the interpolation processing and wherein generating second image data comprises generating the luminance signal using the G1 signal, the R signal, and the B signal.

10. A non-transitory computer-readable storage medium storing a program for causing a computer to execute the method according to claim 9.

11. An image processing apparatus comprising:

an enlargement circuit configured to increase number of pixels in a vertical direction and in a horizontal direction, and to cause each pixel in the pixels to have a luminance signal and a color-difference signal with respect to first image data made of a luminance signal and a color-difference signal;

a conversion circuit connected to the enlargement circuit, and configured to convert the luminance signal and the color-difference signal obtained in the enlargement circuit into image data of a Bayer array made of R, G1, G2, and B signals; and a development circuit configured to generate second image data made of a luminance signal and a color-difference signal from the image data of the Bayer array converted in the conversion circuit, wherein the development circuit generates the luminance signal using one of the G1 signal and the G2 signal, the R signal, and the B signal in the image data of the Bayer array, wherein the development circuit applies interpolation processing to the R signal to cause centroids of the R signal and of the G1 signal to accord with each other, applies interpolation processing to the B signal to cause centroids of the B signal and of the G1 signal to accord with each other, and generates the luminance signal using the G1 signal, the R signal obtained by the interpolation processing, and the B signal obtained by the interpolation processing.

12. An image processing apparatus comprising:

an enlargement circuit configured to increase number of pixels in a vertical direction and in a horizontal direction, and to cause each pixel in the pixels to have a luminance signal and a color-difference signal with respect to first image data made of a luminance signal and a color-difference signal;

a conversion circuit connected to the enlargement circuit, and configured to convert the luminance signal and the color-difference signal obtained in the enlargement circuit into image data of a Bayer array made of R, G1, G2, and B signals; and a development circuit configured to generate second image data made of a luminance signal and a color-difference signal from the image data of the Bayer array converted in the conversion circuit, wherein the development circuit generates the luminance signal using one of the G1 signal and the G2 signal, the R signal, and the B signal in the image data of the Bayer array, wherein the enlargement circuit causes number of pixels of the first image data in the horizontal direction and in the vertical direction to be twice number of pixels of the luminance signal included in the first image data in the horizontal direction and in the vertical direction by interpolation processing.

13. An image processing apparatus comprising:

a processor; and a memory connected to the processor, the memory having instructions that, when executed by the processor, perform operations comprising:

increasing number of pixels of first image data made of a luminance signal and a color-difference signal in a vertical direction and in a horizontal direction, and causing each pixel in the pixels to have a luminance signal and a color-difference signal;

converting the luminance signal and the color-difference signal into image data of a Bayer array made of R, G1, G2, and B signals; and generating second image data made of a luminance signal and a color-difference signal from the image data of the Bayer array, wherein the luminance signal of the second image data is generated from one of the G1 signal and the G2 signal, the R signal, and the B signal in the image data of the Bayer array, wherein generating second image data comprises applying interpolation processing to the R signal to cause centroids of the R signal and of the G1 signal to accord with each other, applying interpolation processing to the B signal to cause centroids of the B signal and of the G1 signal to accord with each other, and generates the luminance signal using the G1 signal, the R signal obtained by the interpolation processing, and the B signal obtained by the interpolation processing.

14. An image processing method comprising:

increasing number of pixels of first image data made of a luminance signal and a color-difference signal in a vertical direction and in a horizontal direction, and causing each pixel in the pixels to have a luminance signal and a color-difference signal;

converting the luminance signal and the color-difference signal into image data of a Bayer array made of R, G1, G2, and B signals; and generating second image data made of a luminance signal and a color-difference signal from the image data of the Bayer array;

wherein the luminance signal of the second image data is generated from one of the G1 signal and the G2 signal, the R signal, and the B signal in the image data of the Bayer array, wherein generating second image data comprises applying interpolation processing to the R signal to cause centroids of the R signal and of the G1 signal to accord with each other, applying interpolation processing to the B signal to cause centroids of the B signal and of the G1 signal to accord with each other, and generates the luminance signal using the G1 signal, the R signal obtained by the interpolation processing, and the B signal obtained by the interpolation processing.

15. A non-transitory computer-readable storage medium storing a program for causing a computer to execute the method according to claim 14.

16. An image processing apparatus comprising:

a processor; and a memory connected to the processor, the memory having instructions that, when executed by the processor, perform operations comprising:

increasing number of pixels of first image data made of a luminance signal and a color-difference signal in a vertical direction and in a horizontal direction, and causing each pixel in the pixels to have a luminance signal and a color-difference signal;

converting the luminance signal and the color-difference signal into image data of a Bayer array made of R, G1, G2, and B signals; and generating second image data made of a luminance signal and a color-difference signal from the image data of the Bayer array, wherein the luminance signal of the second image data is generated from one of the G1 signal and the G2 signal, the R signal, and the B signal in the image data of the Bayer array, and wherein increasing number of pixels of first image data comprises causing number of pixels of the first image data in the horizontal direction and in the vertical direction to be twice number of pixels of the luminance signal included in the first image data in the horizontal direction and in the vertical direction by interpolation processing.

17. An image processing method comprising:

increasing number of pixels of first image data made of a luminance signal and a color-difference signal in a vertical direction and in a horizontal direction, and causing each pixel in the pixels to have a luminance signal and a color-difference signal;

converting the luminance signal and the color-difference signal into image data of a Bayer array made of R, G1, G2, and B signals; and generating second image data made of a luminance signal and a color-difference signal from the image data of the Bayer array;

wherein the luminance signal of the second image data is generated from one of the G1 signal and the G2 signal, the R signal, and the B signal in the image data of the Bayer array, and wherein increasing number of pixels of first image data comprises causing number of pixels of the first image data in the horizontal direction and in the vertical direction to be twice number of pixels of the luminance signal included in the first image data in the horizontal direction and in the vertical direction by interpolation processing.

18. A non-transitory computer-readable storage medium storing a program for causing a computer to execute the method according to claim 17.

* * * * *